US 7,849,042 B2

(12) United States Patent
Yaojie et al.

(10) Patent No.: US 7,849,042 B2
(45) Date of Patent: Dec. 7, 2010

(54) SEARCH RESULT OPTIMIZATION METHOD AND DEVICE THAT ADJUSTS RELIABILITY VALUES OF DOCUMENTS AND ORDERS RETRIEVED DOCUMENTS

(75) Inventors: Lu Yaojie, Beijing (CN); Yin Yueyan, Beijing (CN); You Ganmei, Beijing (CN); Li Gang, Beijing (CN); Zheng Jichuan, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 600 days.

(21) Appl. No.: 11/984,025

(22) Filed: Nov. 13, 2007

(65) Prior Publication Data

US 2008/0114741 A1    May 15, 2008

(30) Foreign Application Priority Data

Nov. 14, 2006   (CN)   ................. 2006 1 0148602

(51) Int. Cl.
*G06F 17/00*   (2006.01)
(52) U.S. Cl. .......................... 706/46; 707/723
(58) Field of Classification Search .......... 706/45–47, 706/62; 707/692, 706, 709, 713, 727–732, 707/748–753; 708/201
See application file for complete search history.

(56) References Cited

U.S. PATENT DOCUMENTS

| 7,747,593 | B2 * | 6/2010 | Patterson et al. | 707/705 |
| 7,761,448 | B2 * | 7/2010 | Meyerzon et al. | 707/731 |
| 2005/0228783 | A1 * | 10/2005 | Shanahan et al. | 707/3 |
| 2006/0184481 | A1 * | 8/2006 | Zhang et al. | 706/45 |
| 2007/0112898 | A1 * | 5/2007 | Evans et al. | 707/205 |

OTHER PUBLICATIONS

Yang et al., A Study on Retrospective and On-Line Event Detection, 1998, ACM, 1-58113-015-5, pp. 28-36.*
Aggarwal et al., On Demand Classification of Data Streams, 2004, ACM, pp. 1-6.*

* cited by examiner

*Primary Examiner*—David R Vincent
(74) *Attorney, Agent, or Firm*—Dickstein Shapiro LLP (57) ABSTRACT

An information searching method is disclosed that is able to effectively utilize non-content descriptive information to optimize preliminary search results and thus improve searching precision. The information searching method includes the steps of extracting one or more non-content characteristics of a document from a document set, analyzing the extracted non-content characteristics, generating an optimizing tool, and optimizing a preliminary search result with the generated optimizing tool.

16 Claims, 7 Drawing Sheets

SEARCH RESULT OPTIMIZATION METHOD AND DEVICE THAT ADJUSTS RELIABILITY VALUES OF DOCUMENTS AND ORDERS RETRIEVED DOCUMENTS

BACKGROUND OF THE INVENTION

1. Field of the Invention

The present invention relates to a method and a device for information searching, and particularly, to a method and a device able to optimize search results based on non-content characteristics of a document.

2. Description of the Related Art

In recent years and continuing, more and more digital text documents appear on the Internet and in digital libraries, news, and internal documents of companies. In order to manage these digital data, more and more attention has been put on information searching techniques. On the other hand, the information searching techniques are becoming more and more open and flexible, so that nowadays information searching is open, dynamic, and very fast. At the same time the amount of information has increased explosively, so a high-precision searching technique is required.

It is noted that text information includes not only a portion expressing the content of the text document, but also non-content descriptive information, such as the creation time and attributes of the text document. In most information searching systems of the related art, during information searching, usually, only keyword-matching and word distributions are utilized, which are internal content characteristics of the documents, but non-content characteristics are not used.

SUMMARY OF THE INVENTION

The present invention may solve one or more problems of the related art.

A preferred embodiment of the present invention may provide an information searching method and an information searching device able to effectively utilize non-content descriptive information to optimize search results and thus improve searching precision.

According to a first aspect of the present invention, there is provided an information searching method, comprising the steps of:

extracting one or more non-content characteristics of a document from a document set;

analyzing the extracted non-content characteristics;

generating an optimizing tool based on the analyzing results; and optimizing a preliminary search result with the generated optimizing tool.

According to a second aspect of the present invention, there is provided an information searching device, comprising:

a non-content characteristics extractor configured to extract one or more non-content characteristics of a document from a document set;

an analyzer configured to analyze the extracted non-content characteristics and generate an optimizing tool based on the analyzing results; and an optimizer configured to optimize a preliminary search result with the generated optimizing tool.

According to an embodiment of the present invention, it is possible to effectively optimize search results and improve searching precision.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

Figure 1:
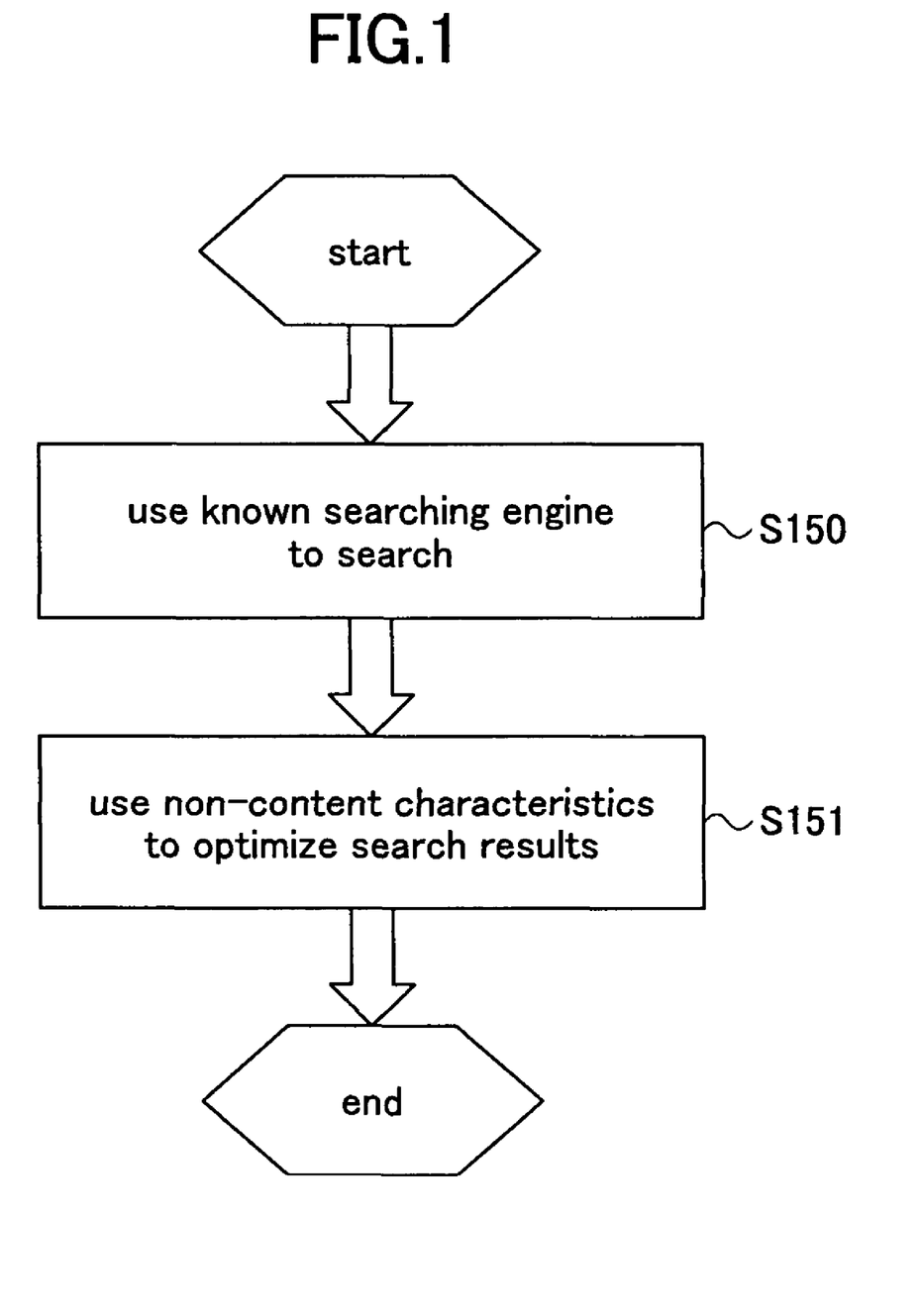
FIG. 1 is a flowchart illustrating a general concept of an embodiment of the present invention.

FIG. 1 is a flowchart illustrating a general concept of an embodiment of the present invention.

As shown in FIG. 1, in step S150, any known searching engine is used to perform searching.

In step S151, non-content characteristics of documents are used to optimize preliminary search results and output the optimized search results.

Figure 2:
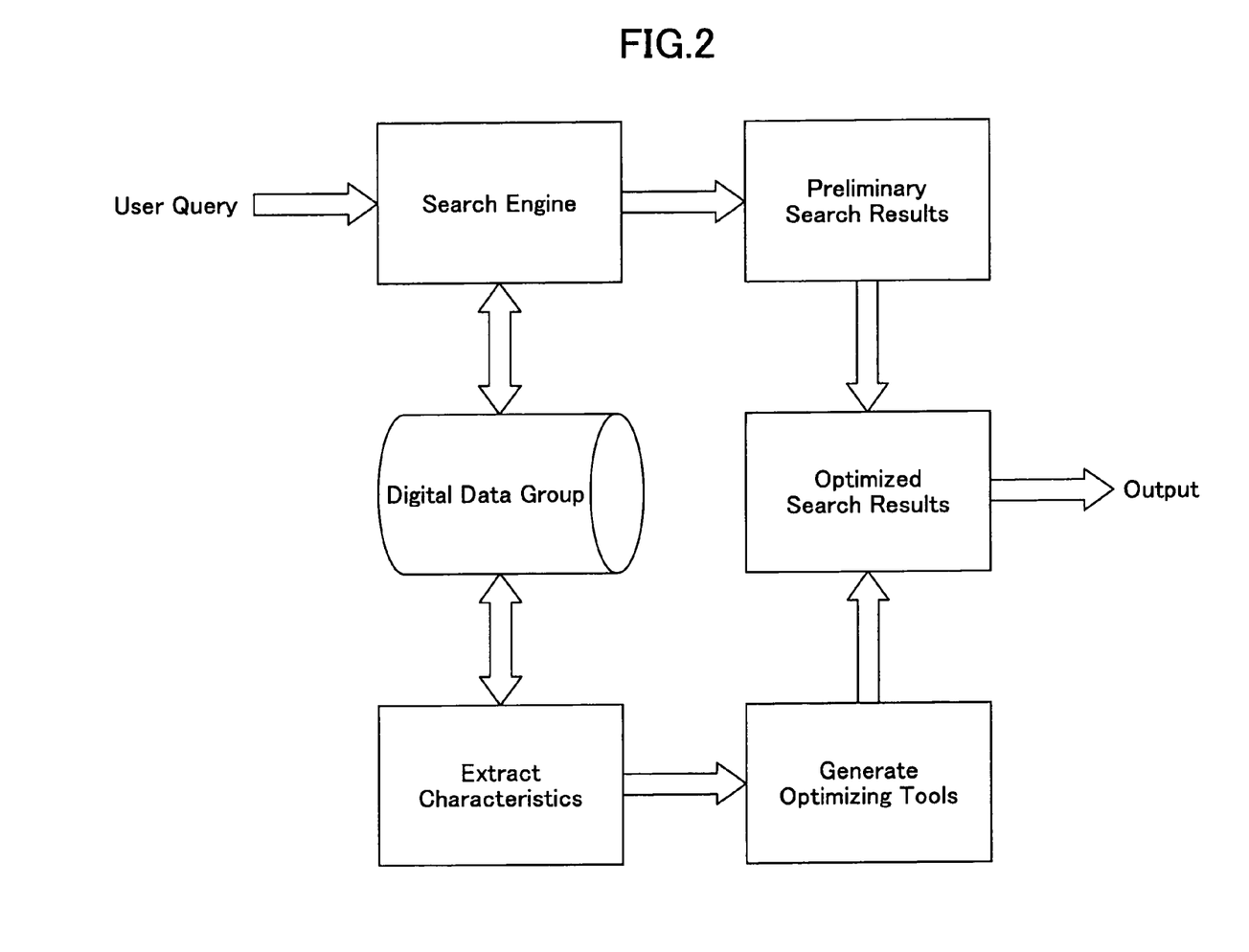
FIG. 2 is a block diagram illustrating an information searching method according to an embodiment of the present invention.

FIG. 2 is a block diagram illustrating an information searching method according to an embodiment of the present invention.

As shown in FIG. 2, first, for a given data group, for example, a digital data group, non-content characteristics of a document in the document set are extracted by a non-content characteristics extractor.

The non-content characteristics of the documents include intrinsic characteristics of the document, external descriptions, and relationships between documents. The intrinsic characteristics of the document are characteristics of the document itself, such as a creation time, a file size, document formats (for example, PDF format, WORD format, TXT format, and so on), and author of the document. The external descriptions of a document are descriptions independent of contents of the document, for example, the version information of the document, classification information of the document, and the storage place of the document. The relationships between documents may be a citation relation between documents, or the relationship like an electronic mail message and a reply.

After the non-content characteristics of the document are extracted, each of the extracted non-content characteristics is analyzed by an analyzer to generate respective optimizing tools. The optimizing tool can optimize search results. The search results may be the results obtained by searching a given data group with a search engine, or the results obtained by another optimizing tool. For example, the results include a document sequence, and each document in the document sequence has a reliability value indicating the probability of the document being the final search result. Then, the optimizing tools optimize the search results and return the optimized search results to a user who is performing the search.

Figure 3:
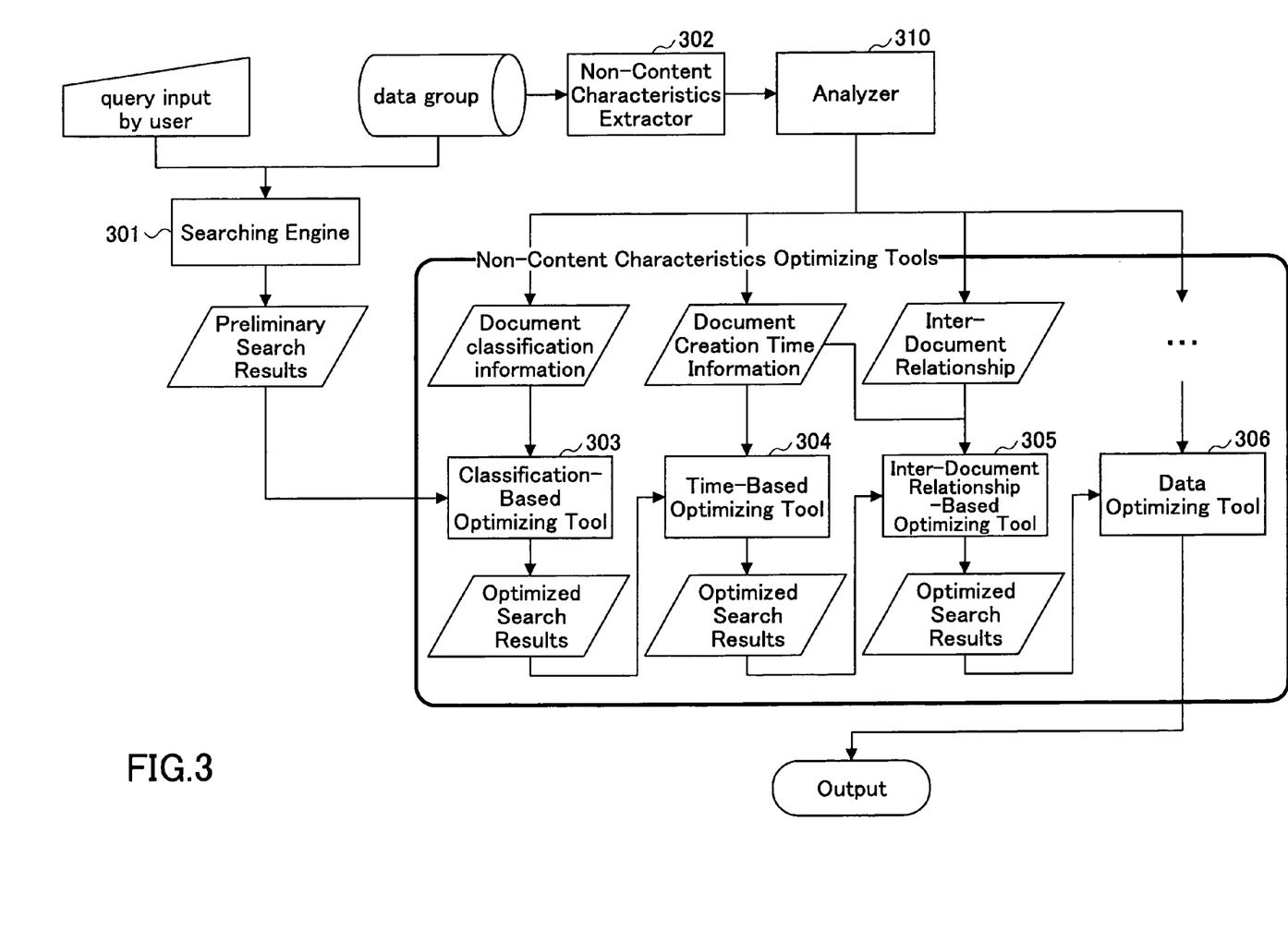
FIG. 3 is a diagram illustrating configurations and operations of an information searching device for executing the information searching method of the embodiment of the present invention.

FIG. 3 is a diagram illustrating configurations and operations of an information searching device for executing the information searching method of the embodiment of the present invention.

As shown in FIG. 3, the information searching device includes a search engine 301, a non-content characteristics extractor 302, an analyzer 310, and optimizing tools 303 through 306.

When a user inputs a query, the query is sent to the search engine 301, and the search engine 301 performs searching to obtain preliminary search results.

The non-content characteristics extractor 302 extracts non-content characteristics of documents in a document set.

The analyzer 310 analyzes the extracted non-content characteristics and generates optimizing tools 303 through 306 based on the analyzing results. For example, the optimizing tool 303 is generated based on document classification information (hence, the optimizing tool 303 is referred to as "a classification-based optimizing tool" herein after), the optimizing tool 304 is generated based on document creation time (hence, the optimizing tool 304 is referred to as "a time-based optimizing tool" herein after), the optimizing tool 305 is generated based on document relationship (hence, the optimizing tool 305 is referred to as "a document relationship-based optimizing tool" herein after), and the optimizing tool 306 is generated based on other characteristic N (the optimizing tool 306 is referred to as "data optimizing tool" herein after).

In other words, the search engine 301 performs preliminary searching to obtain preliminary search results, and the classification-based optimizing tool 303, the time-based optimizing tool 304, the document relationship-based optimizing tool 305, and the data optimizing tool 306 optimize the preliminary search results; thus final optimized search results are obtained, and the final optimized search results are returned to the user.

Below, configurations of the optimizing tools 303 through 306 are described in detail.

Time-Based Optimizing Tool 304

In various fields of society, there are usually some hot topics in a specified time interval, and documents discussing these hot topics are usually concentrated in time. Thus when searching for one of the hot topics, the search results are also concentrated in time. Hence time characteristics can be used to filter some noise in the preliminary search results.

Figure 4:
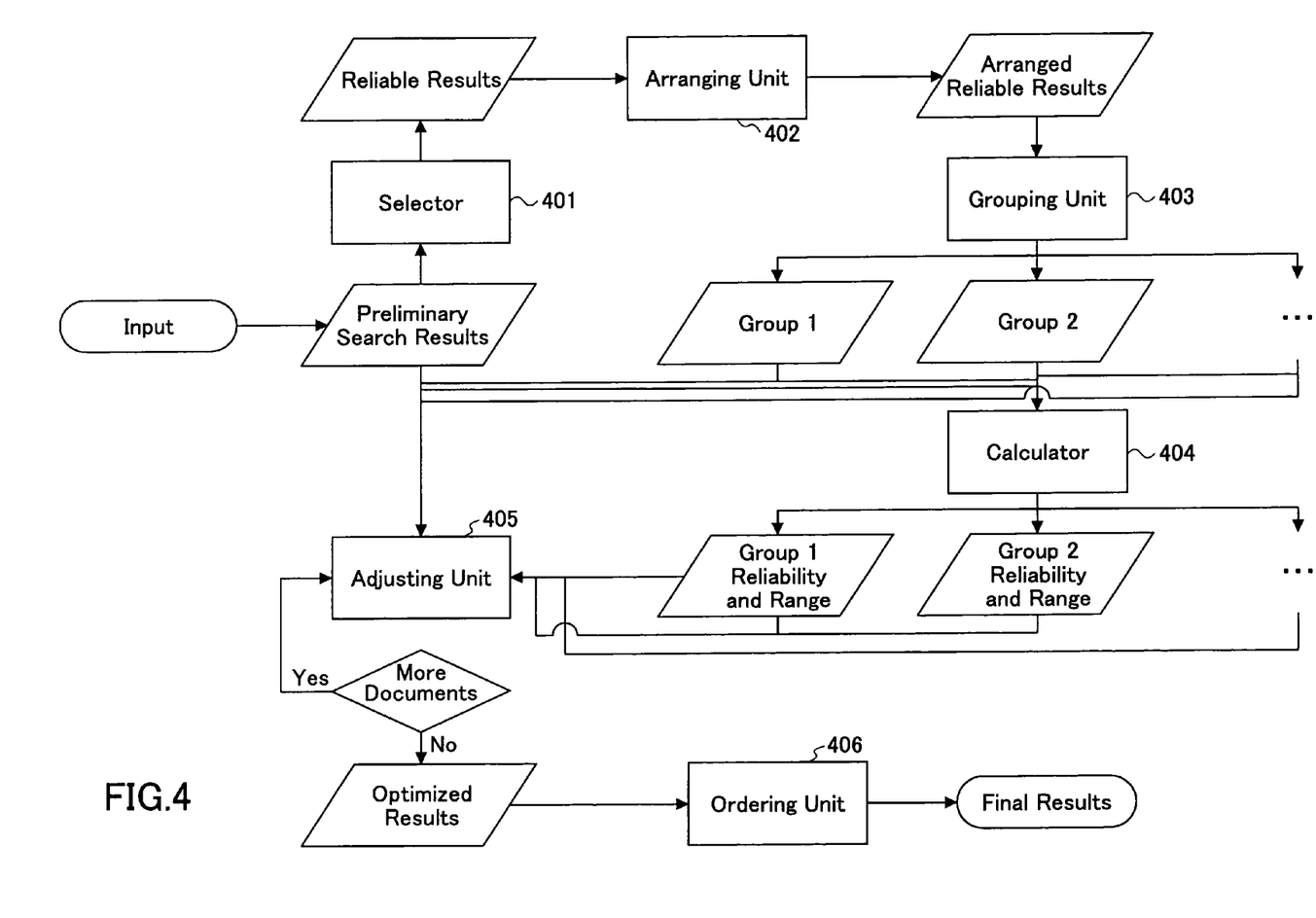
FIG. 4 is a diagram illustrating configurations and operations of the time-based optimizing tool 304 according to the embodiment of the present invention.

FIG. 4 is a diagram illustrating a configuration and operations of the time-based optimizing tool 304 according to the embodiment of the present invention.

As shown in FIG. 4, the time-based optimizing tool 304 includes a reliable result selector 401, an arranging unit 402, a grouping unit 403, a calculator 404, an adjusting unit 405, and an ordering unit 406.

The reliable result selector 401 selects from the preliminary search results, a resulting document sequence having relatively high reliability.

Specifically, two parameters N and M are provided, where N represents the number of the output results, M represents the maximum uncertainty of the number of the output results, and M<N.

For example, if the number of the documents in the preliminary results is less than N, the reliable result selector 401 returns the preliminary results directly as the final results (that is, the resulting document sequence having relatively high reliability). If the number of the documents in the preliminary results is less than N+M, the reliable result selector 401 sets the maximum number MAX of the documents to be processed to be the number of the output results N. If the number of the documents in the preliminary results is equal to or greater than N+M, the reliable result selector 401 set the maximum number MAX of the documents to be processed by itself to be N+M.

Then, the reliable result selector 401 calculates differences of the reliability values of every two documents from a (N−M)-th document to a MAX-th document, and obtains a document corresponding to the maximum difference. If the maximum difference corresponds to plural documents, the first document is chosen. The order number of the obtained documents is denoted to be X.

Then, the reliable result selector 401 returns the first document to the X-th document as the selection results; that is, the resulting document sequence having relatively high reliability.

The arranging unit 402 arranges the documents of the resulting document sequence having relatively high reliability in order of creation time, for example, from the earliest one to the latest one.

The grouping unit 403 groups the documents arranged in order of creation time into Y groups.

Specifically, the grouping unit 403 calculates differences of the creation times of every two input documents, calculates an average AVG of all the differences of the creation times, then selects documents having a creation time differences greater than a*AVG, where a is a parameter for controlling grouping granularity. Then the grouping unit 403 groups the input documents arranged in order of creation time into Y groups with the selected documents as group boundaries. Then the grouping unit 403 returns the grouping results.

The calculator 404 calculates a sum of the reliability values of documents in each group to obtain a group reliability value and a group action range of each group. For example, a maximum value and a minimum value of the reliability values of the documents in each group are used as limits of the group action range. Then, the calculator 404 returns the group reliability values and the group action ranges of all groups.

The adjusting unit 405 adjusts the reliability values of the documents included in the preliminary search results.

For example, the adjusting unit 405 determines whether each of the documents is in one or more group action ranges of the groups, and if the reliability value of the document is in the group action range of a group, the adjusting unit 405 increases the reliability value of the document by b*Rg to obtain a new group reliability value. Here, b is a parameter for controlling adjustment magnitude of the document creation time on the preliminary search result, where the maximum of b is not greater than 5% of the average reliability values of all documents, and Rg represents the group reliability value of the current group.

The ordering unit 406 arranges the documents in descending order of the adjusted reliability values to obtain optimized results.

Document Relationship-Based Optimizing Tool 305

Usually, documents have certain relationship with each other. For example, one document may cite contents of other documents, or one electronic mail message (a document) replies to another electronic mail message (another document). Those documents having a relationship are usually associated with the same subject; hence search results of those documents having a relationship are closely related to each other. Due to this, document-relationship characteristics can be used to filter some noise in the preliminary search results.

Figure 5:
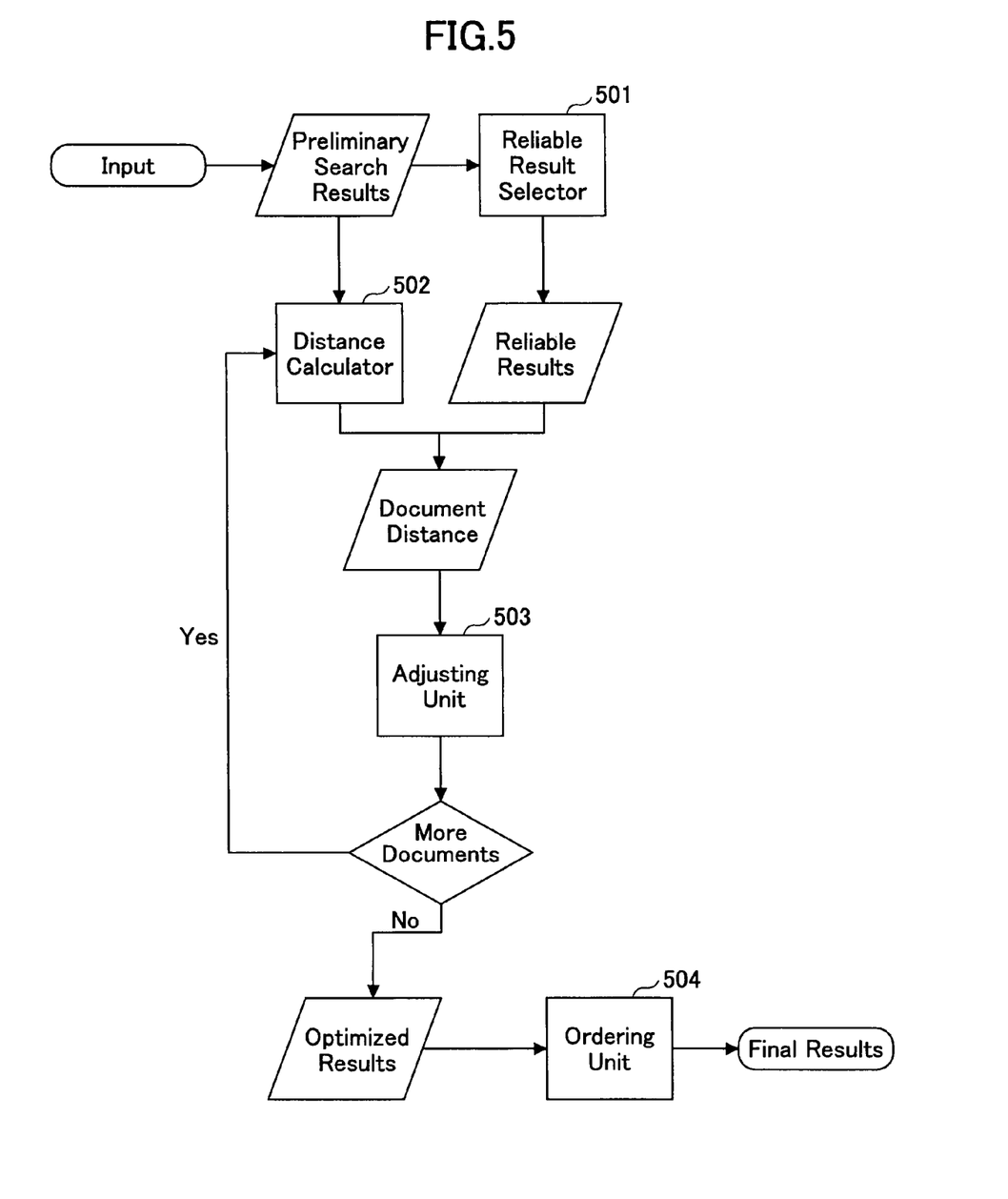
FIG. 5 is a diagram illustrating configurations and operations of the document relationship-based optimizing tool 305 according to the embodiment of the present invention.

FIG. 5 is a diagram illustrating configurations and operations of the document relationship-based optimizing tool 305 according to the embodiment of the present invention.

As shown in FIG. 5, the document relationship-based optimizing tool 305 includes a reliable result selector 501, a distance calculator 502, an adjusting unit 503, and an ordering unit 504.

The reliable result selector 501 selects a resulting document sequence having relatively high reliability from the preliminary search results. The reliable result selector 501 operates in the same way as the reliable result selector 401, and detailed explanations are omitted.

The distance calculator 502 calculates a distance from each of the documents in the resulting document sequence to each of the other documents in the resulting document sequence, which has relatively high reliability.

Since there are several kinds of document relationships, a weight is assigned to each kind of document relationship. For example, the citation relationship is represented by Q1, the weight of a document which cites other documents is defined to be Q11, and the weight of a document which is cited by other documents is defined to be Q12, where the second digit "1" in the suffix "11" represents the citing relationship, and the second digit "2" in the suffix "12" represents the being cited relationship.

In addition, the electronic mail reply relationship is represented by Q2, the weight of a document which is a reply to another electronic mail message is defined to be Q21, and the weight of a document which is replied to by another electronic mail message is defined to be Q22, where the second digit "1" in the suffix "21" represents replying relationship, and the second digit "2" in the suffix "22" represents being replied to relationship.

Figure 6:
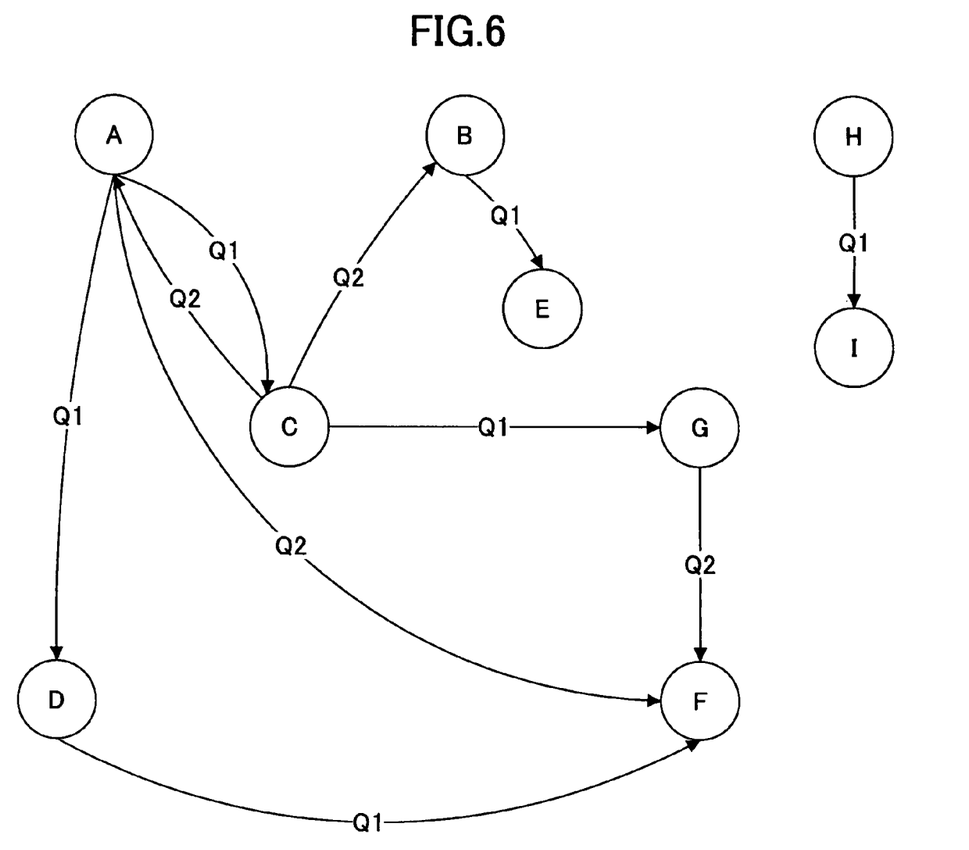
FIG. 6 is a diagram illustrating document relationships in a data group.

With these notations, a data group can be expressed to be a directional diagram group as shown in FIG. 6.

FIG. 6 is a diagram illustrating document relationships in a data group.

In the directional diagram shown in FIG. 6, the above-defined weights are referred to as "weights of sides". For example, the weight of the side from a point D to a point F is Q11, and the weight of the side from the point F to the point D is Q12.

Between any two points, there may be one or more paths, or there may be no path; further, a path does not include cycles.

The distance of any directional path is calculated as indicated below.

First, the distance is defined to be a sum of the weights of sides passed through by the directional path. For example, in FIG. 6, the distance from a point B to a point G is Q22+Q11.

If there is no path between two documents, it is defined that the distance between the two documents is infinite, and the distance from one document to itself is zero.

If there are plural paths between the two documents, the distance L between the two documents is expressed by the following equation, $$L=1/((1/L1)+(1/L2)+\ldots+(1/LX))$$

where L1 represents the distance of a path 1, L2 represents the distance of a path 2, ... LX represents the distance of a path X.

For example, in FIG. 6, the distance L from a point A to a point F equals:

$$L=1/((1/Q21)+(1/(Q22+Q11+Q21))+(1/(Q11+Q11+Q21)))$$

The adjusting unit 503 adjusts the reliability values of the documents included in the preliminary search results.

For example, the adjusting unit 503 determines the distance from a document in the preliminary search results to a document in the selected resulting document sequence, which has a high reliability value, and increases the reliability value of each document included in the preliminary search results by $$b*Rd/(1+L),$$

where b is a parameter, and the size of b controls the adjustment magnitude of the distance between two documents in the preliminary search result, Rd represents the reliability values of the documents in the selected resulting document sequence, and L represents the distance from the document in the preliminary search result to the document of the selected resulting document sequence.

The ordering unit 504 arranges the documents in descending order of the adjusted reliability values to obtain optimized results.

Document Relationship and Creation Time-Based Optimizing Tool

Since the document relationship-based optimizing tool 305 involves many parameters and calculations in calculating the distance between two documents, sometimes it takes some time to find an appropriate value. To solve this problem, the characteristic of the document creation time can be introduced in the document relationship-based optimizing tool 305.

Operations of the optimizing tool of this example are basically the same as those of the document relationship-based optimizing tool 305 except that calculation of the distance between two documents is performed in a different way. In this example, the calculator for calculating the distance between two documents provides correlation between the two documents.

Similarly, since there are several kinds of document relationships, a weight is assigned to each kind of document relationship. For example, and the weight of the citation relationship is represented by Q1, the weight of the electronic mail reply relationship is represented by Q2. Note that, here, the weight values are not directional.

Figure 7:
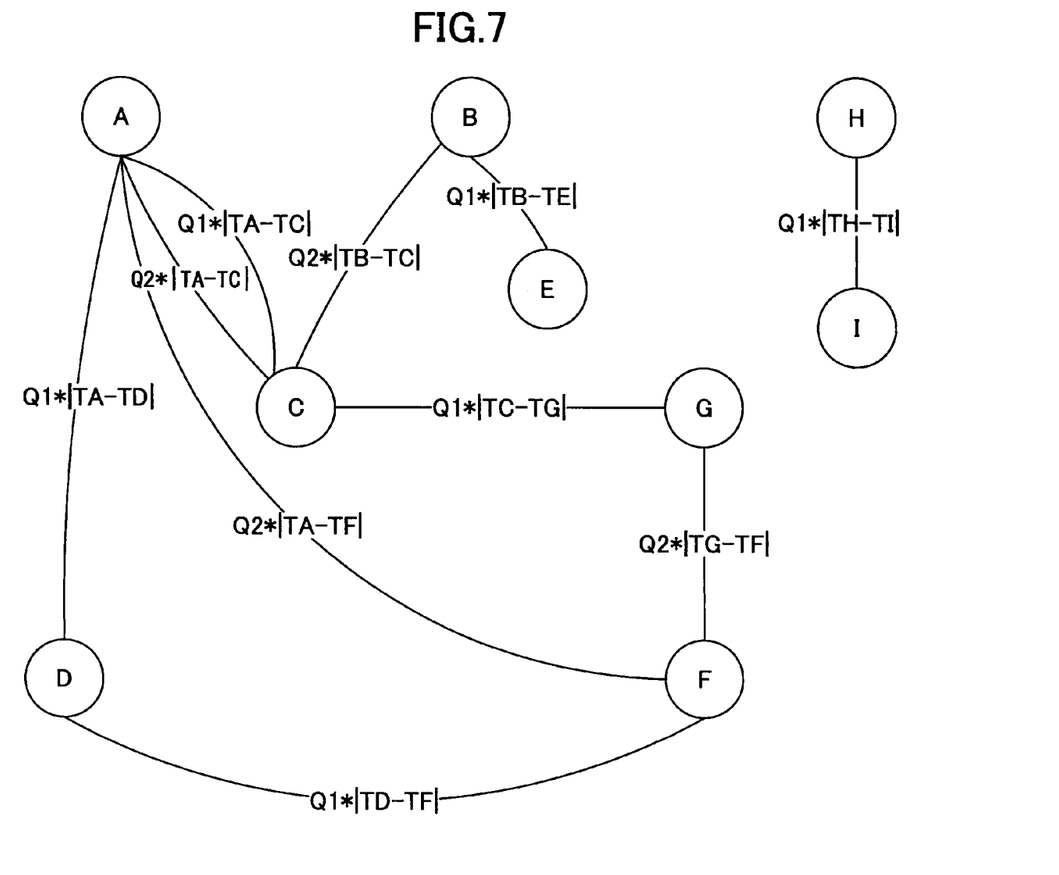
FIG. 7 is a diagram illustrating document relationships in a data group.

With these notations, a data group can be expressed to be a non-directional diagram group as shown in FIG. 7.

FIG. 7 is a diagram illustrating document relationships in a data group.

In the non-directional diagram shown in FIG. 7, the length of a side equals a product of the weight of the relationship between the two documents and the difference between the creation times of the two documents.

In this example, the length of a side equals the product of Q1 and the difference between the creation times of the two documents, or equals the product of Q2 and the difference between the creation times of the two documents.

The optimizing tool of this example calculates the distance between any two documents. Here, the distance of a non-directional path equals the sum of the lengths of the sides passed through by the non-directional path.

For example, in FIG. 7, the distance from a point B to a point G is $Q2*|TB-TC|+Q1*|TC-TG|$, where, $|TB-TC|$ represents the difference between the creation times of the document B and the document C, and $|TC-TG|$ represents the difference between the creation times of the document C and the document G.

Similar to the method shown in FIG. 6, in this example, if there is no path between two documents, it is defined that the distance between the two documents is infinite; the distance from one document to itself is zero.

If there are plural paths between the two documents, the distance L between the two documents is expressed by the following equation, $$L=1/((1/L1)+(1/L2)+\ldots+(1/LX))$$

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Chinese Priority Patent Application No. 200610148602 filed on Nov. 14, 2006, the entire contents of which are hereby incorporated by reference.

What is claimed is:

1. A computer-implemented information searching method, comprising the steps of: extracting one or more non-content characteristics of a document from a document set; analyzing the extracted non-content characteristics; generating an optimizing tool based on analyzing results; and optimizing a preliminary search result with the generated optimizing tool, wherein the step of optimizing includes the steps of: selecting, from the preliminary search result, a resulting document sequence having relatively high reliability; calculating a distance from each of the documents in the preliminary search results to each document of the resulting document sequence; adjusting the reliability values of the documents in the resulting document sequence; and arranging the documents in descending order of the adjusted reliability values to obtain optimized results, and wherein the distance from each of the documents in the preliminary search results to the document of the resulting document sequence equals a sum of weights of sides passed through by a directional path between two documents, the distance is infinite when there is no path between the document in the preliminary search results and the document in the resulting document sequence, the distance from one document to itself is zero, the distance L between the document in the preliminary search results and the document in the resulting document sequence is expressed by the following equation when there are plural paths between the two documents, $L=1/((1/L1)+(1/L2)+\ldots+(1/LX))$ where, L represents the distance between two documents, L1 represents the distance of a path 1, L2 represents the distance of a path 2, and LX represents the distance of a path X.

2. The information searching method as claimed in claim 1, wherein the non-content characteristics of a document include intrinsic characteristics of the document, external descriptions, and relationships between documents.

3. The information searching method as claimed in claim 1, wherein the preliminary search result includes a result obtained by searching a predetermined data group with a search engine, or a result obtained by another optimizing tool, the result obtained by searching the predetermined data group or by the other optimizing tool is a document sequence, and each document in the document sequence has a reliability value indicating a probability of the document being a target document.

4. The information searching method as claimed in claim 1, wherein the optimizing tool includes one of a classification-based optimizing tool, a time-based optimizing tool, and a document relationship-based optimizing tool.

5. The information searching method as claimed in claim 1, wherein the step of optimizing includes the steps of:
selecting, from the preliminary search result, a resulting document sequence having relatively high reliability;
arranging the documents of the resulting document sequence in order of creation time;
grouping the documents arranged in order of creation time into plural groups;
calculating a sum of reliability values of documents of one of the groups to obtain and output a group reliability value, a maximum value and a minimum value of the reliability values of the documents of the one of the groups being regarded as a group action range;
adjusting the reliability values of the documents in the resulting document sequence; and
arranging the documents in descending order of the adjusted reliability values to obtain optimized results.

6. The information searching method as claimed in claim 5, wherein the step of selecting includes the steps of:
if a number of the documents in the preliminary search result is less than N, returning the preliminary search result directly, and if the number of the documents in the preliminary search result is less than N+M, specifying a maximum number MAX of documents to be processed to be a number of output results, and if the number of the documents in the preliminary search result is equal to or greater than N+M, specifying the maximum number MAX of documents to be processed to be N+M, where N is the number of the output results, M is the maximum uncertainty of the number of the output results, and M<N;
calculating differences of the reliability values of every two documents from a (N−M)-th document to a MAX-th document, and determining an order number of a document corresponding to a maximum difference; and
returning a first document to an X-th document.

7. The information searching method as claimed in claim 5, wherein the step of grouping includes the steps of:
calculating differences of the creation times of every two input documents;
calculating an average AVG of all the differences of the creation times;
selecting documents having the creation time differences greater than a*AVG, where a is a parameter for controlling grouping granularity; and
grouping the documents with the selected documents as group boundaries.

8. The information searching method as claimed in claim 5, wherein the step of adjusting includes the step of:
determining whether each of the documents in the preliminary search results is in group action ranges of one or more of the groups, and if the reliability value of the document is in the group action range of one of the groups, increasing the reliability value of the document by b*Rg, where b is a parameter for controlling adjustment magnitude of the document creation time on the preliminary search result, a maximum of b is not greater than 5% of an average reliability value of all the documents, and Rg represents the group reliability value of the group.

9. The information searching method as claimed in claim 1, wherein said distance equals a sum of lengths of sides passed through by a non-directional path between two documents, and the length of each side equals a product of a weight of the relationship between the two documents and a difference between the creation times of the two documents.

10. The information searching method as claimed in claim 1, wherein the step of adjusting includes the step of:

determining the distance from each of the documents included the preliminary search results to each document of the resulting document sequence, and increasing the reliability value of the document included the preliminary search results by $$b*Rd/(1+L),$$

where b is a parameter, and the size of b controls adjustment magnitude of the distance between two documents on the preliminary search result, Rd represents the reliability values of the documents of the selected resulting document sequence, and L represents the distance from the document included in the preliminary search results to the document of the selected resulting document sequence.

11. A computer-implemented information searching device, comprising: a non-content characteristics extractor configured to extract one or more non-content characteristics of a document from a document set; an analyzer configured to analyze the extracted non-content characteristics and generate an optimizing tool based on analyzing results; and an optimizer configured to optimize a preliminary search result with the generated optimizing tool, wherein the optimizer comprises: a reliable result selector configured to select, from the preliminary search result, a resulting document sequence having relatively high reliability; a distance calculator configured to calculate a distance from each of the documents to each document of the selected resulting document sequence; an adjusting unit configured to adjust the reliability values of the documents; and an ordering unit configured to arrange the documents in descending order of the adjusted reliability values to obtain optimized results, and wherein the distance from each of the documents in the preliminary search results to the document of the resulting document sequence equals a sum of weights of sides passed through by a directional path between two documents, the distance is infinite when there is no path between the document in the preliminary search results and the document in the resulting document sequence, the distance from one document to itself is zero, the distance L between the document in the preliminary search results and the document in the resulting document sequence is expressed by the following equation when there are plural paths between the two documents, $$L=1/((1/L1)+(1/L2)+\ldots+(1/LX))$$ where, L represents the distance between the two documents, L1 represents the distance of a path 1, L1 represents the distance of a path 2, and LX represents the distance of a path X.

12. The information searching device as claimed in claim 11, wherein the non-content characteristics of a document include intrinsic characteristics of the document, external descriptions, and relationships between documents.

13. The information searching device as claimed in claim 11, wherein the preliminary search result includes a result obtained by searching a predetermined data group with a search engine, or a result obtained by another optimizing tool, the result obtained by searching the predetermined data group or by the other optimizing tool is a document sequence, and each document in the document sequence has a reliability value indicating a probability of the document being a target document.

14. The information searching device as claimed in claim 11, wherein the optimizing tool includes one of a classification-based optimizing tool, a time-based optimizing tool, and a document relationship-based optimizing tool.

15. The information searching device as claimed in claim 11, wherein the optimizer comprises:

a reliable result selector configured to select, from the preliminary search result, a resulting document sequence having relatively high reliability;

an arranging unit configured to arrange the documents of the resulting document sequence in order of creation time;

a grouping unit configured to group the documents arranged in order of creation time into plural groups;

a calculator configured to calculate a sum of reliability values of documents of one of the groups to obtain and output a group reliability value, a maximum value and a minimum value of the reliability values of the documents of the one of the groups being regarded as a group action range;

an adjusting unit configured to adjust the reliability values of the documents; and an ordering unit configured to arrange the documents in descending order of the adjusted reliability values to obtain optimized results.

16. The information searching device as claimed in claim 11, wherein said distance equals a sum of lengths of sides passed through by a non-directional path between the two documents, and the length of each side equals a product of a weight of the relationship between the two documents and a difference between the creation times of the two documents.

* * * * *